(12) United States Patent
Latorre

(10) Patent No.: US 6,769,373 B1
(45) Date of Patent: Aug. 3, 2004

(54) ATTACHABLE BOW PLATE FOR REDUCING BOW SINKAGE AND VESSEL DRAG

(75) Inventor: Robert G. Latorre, Metairie, LA (US)

(73) Assignee: University of New Orleans Research and Technology Foundation, Inc., New Orleans, LA (US)

( * ) Notice: Subject to any disclaimer, the term of this patent is extended or adjusted under 35 U.S.C. 154(b) by 0 days.

(21) Appl. No.: 10/306,822

(22) Filed: Nov. 27, 2002

Related U.S. Application Data

(60) Provisional application No. 60/334,030, filed on Nov. 27, 2001.

(51) Int. Cl.[7] .................................................. B63B 1/32
(52) U.S. Cl. ..................................... 114/67 R; 114/219
(58) Field of Search ............................. 114/2, 26, 67 R, 114/219, 11, 249, 61.27

(56) References Cited

U.S. PATENT DOCUMENTS

| | | | |
|---|---|---|---|
| 661,303 A | 11/1900 | Briggs | |
| 1,191,445 A | * 7/1916 | Lowy | ............................ 114/13 |
| 1,593,866 A | * 7/1926 | Christinzio | ................... 293/119 |
| 2,378,822 A | 6/1945 | Barry | |
| 2,404,492 A | * 7/1946 | Hait | ........................ 440/12.64 |
| 2,791,980 A | * 5/1957 | Best, Jr. | ................... 114/61.27 |
| 2,799,494 A | * 7/1957 | Pollock | ....................... 267/140 |
| 2,847,964 A | * 8/1958 | Skinas | ......................... 114/219 |
| 3,680,517 A | 8/1972 | Morrison | |
| 3,934,531 A | 1/1976 | Allen | |
| 4,003,325 A | 1/1977 | Allen | |
| 4,041,885 A | 8/1977 | Garcia | |
| 4,377,123 A | 3/1983 | Jackson | |
| 4,513,679 A | 4/1985 | Allen | |
| 4,569,302 A | 2/1986 | Gruzling | |
| 4,776,294 A | 10/1988 | Childs | |
| 5,090,352 A | 2/1992 | Stanford | |
| 5,117,882 A | 6/1992 | Stanford | |
| 5,787,832 A | 8/1998 | Spinka | |

* cited by examiner

*Primary Examiner*—Sherman Basinger
(74) *Attorney, Agent, or Firm*—Garvey, Smith, Nehrbass & Doody, L.L.C.; Seth M. Nehrbass

(57) ABSTRACT

An attachable vertical bow plate set a distance ahead of the existing bow, preferably extending above and below the water surface, helps to reduce drag associated with a vessel. The plate's lower edge is preferably set at a depth corresponding to the depth where the existing bow begins to have its cut away.

27 Claims, 4 Drawing Sheets

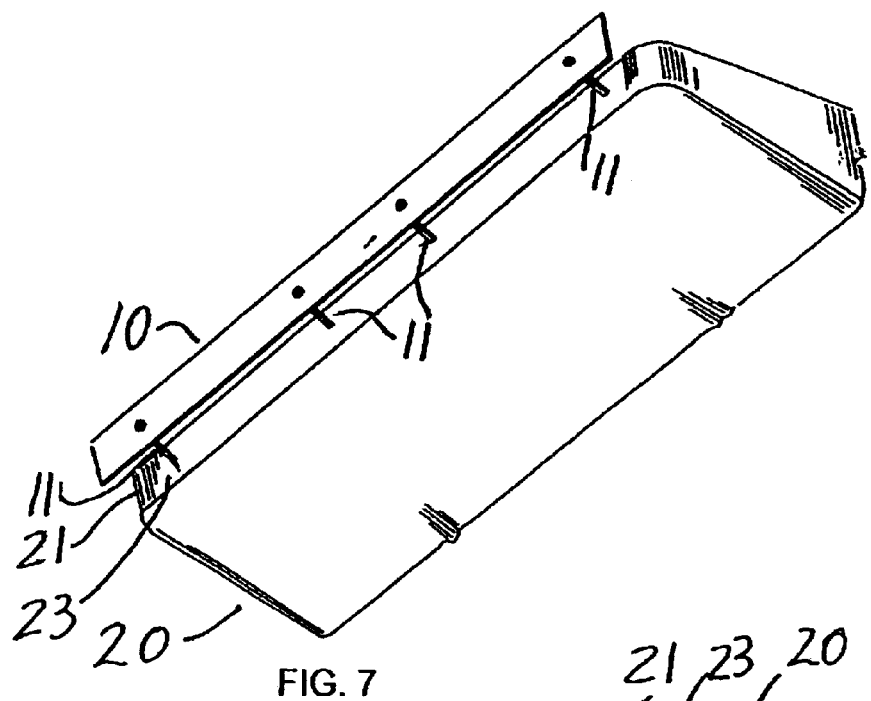
FIG. 7
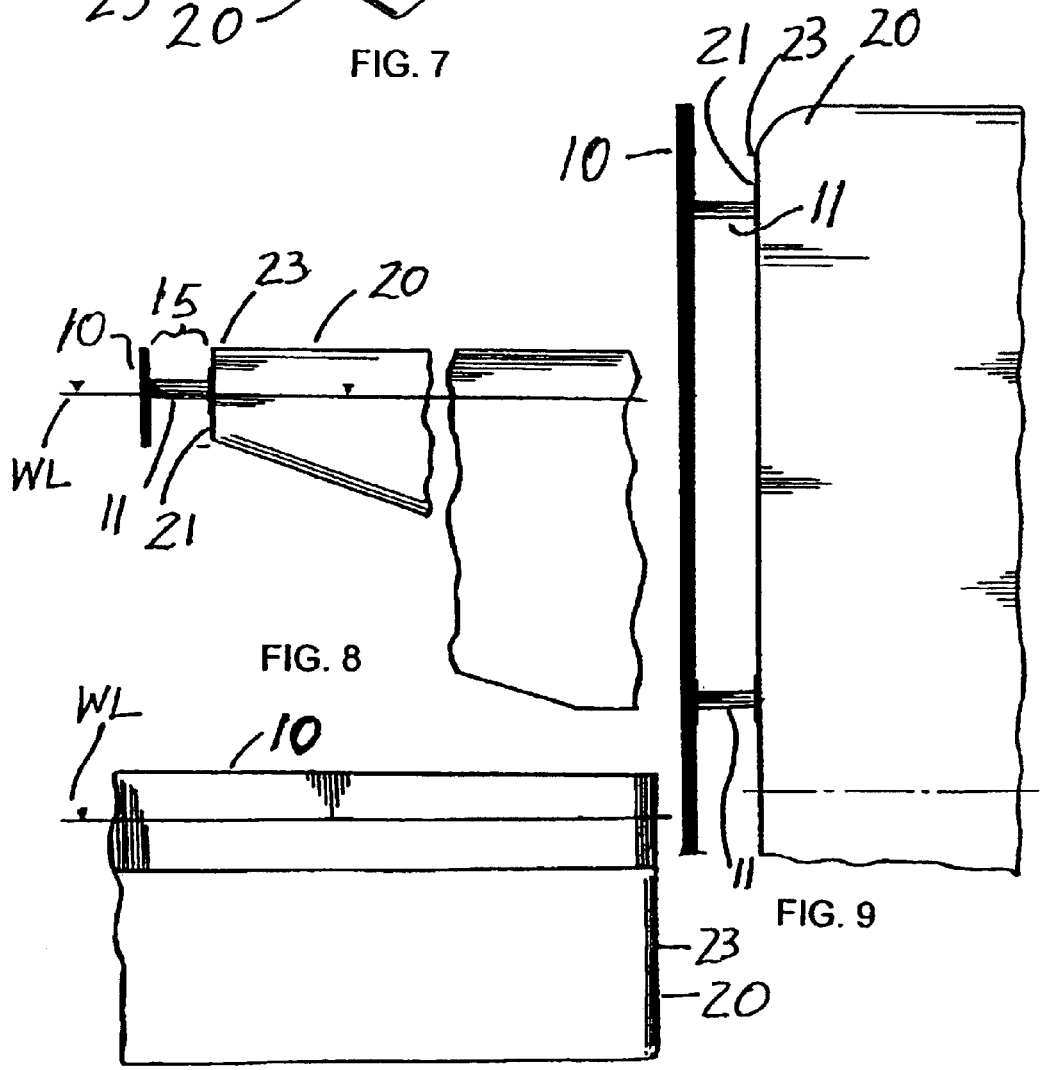
FIG. 8
FIG. 9
FIG. 10

ATTACHABLE BOW PLATE FOR REDUCING BOW SINKAGE AND VESSEL DRAG

CROSS-REFERENCE TO RELATED APPLICATIONS

Priority of U.S. Provisional Patent Application Serial No. 60/334,030, filed Nov. 27, 2001, incorporated herein by reference, is hereby claimed.

NON-PUBLICATION REQUEST

I hereby certify that the Invention disclosed in this application has not and will not be the subject of an application filed in another country, or under a multilateral agreement, that requires publication at eighteen months after filing. I hereby request that this application not be published under 35 U.S.C. Section 122(b).

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to bow sinkage and vessel drag. More particularly, the present invention relates to apparatus for reducing bow sinkage and vessel drag.

2. General Background of the Invention

A large number of barges and offshore structures such as jack-ups and liftboats have rectangular hulls with square, blunt bows. A large amount of power is used when these vessels are towed or self-propelled.

Careful observation of the bow flow shows a large eddy forms at the bow corner and water is pushed ahead as the vessel moves.

See also Gorban', V. and I. Gorban', "Dynamics of vortices in near-wall flows: eigenfrequencies, resonant properties, algorithms of control", NATO AGARD Report 827, "High Speed Body Motion in Water", AGARD-R-827, September 1997, which, with all references it cites, is incorporated herein by reference (see particularly FIG. 11).

The following U.S. Patents are incorporated herein by reference:

U.S. Pat. Nos. 661,303, 2,378,822, 3,680,517, 3,934,531, 4,003,325, 4,041,885, 4,377,123, 4,513,679, 4,569, 302, 4,776,294, 5,090,352, 5,117,882, 5,787,832 6,324, 480, 6,213,824.

U.S. Pat. No. 4,513,679 discloses a drag-reducing device for barges that is placed at the bow of the barge.

U.S. Pat. Nos. 4,377,123; 4,041,885; and 5,787,832 disclose attachable devices that stabilize and break through the plane of the water when the bow cuts through the water.

U.S. Pat. No. 3,934,531; 4,003,325; 3,680,517; and 4,569, 302 disclose methods of reducing friction and drag for large barge-like cargo ships or boats.

U.S. Pat. Nos. 5,117,882 (see especially FIG. 11); 5,090, 352; 661,303; and 2,378,822 disclose vertical structures placed ahead of the bow to reduce drag.

BRIEF SUMMARY OF THE INVENTION

The prior art patents mentioned above include:

a) five patents (U.S. Pat. Nos. 3.934,531; 4,003,325; 4,041,885; 4,377,123; 4,776,294) with a horizontal plate/foil submerged below the water surface;

b) six patents dealing with air injection drag reduction materials;

c) One patent for stern skegs (rudders); and d) One patent for stabilizer floats.

Main conclusion:

The patents do not disclose or suggest the bow plate concept of the present invention. Specifically:

1. The bow plate of the present invention is mounted vertically—the patents have horizontal plates.

U.S. Pat. No. 4,513,679 discloses a flexible mat which conveys air under the barge bottom, while the bow plate of the present is rigid and is mounted ahead of the bow—there is no contact between the bow and bow plate of the present invention.

U.S. Pat. No. 4,041,8 85 is a vertical submerged horizontal hydrofoil—the bow plate of the present invention is mounted ahead of the bow, not directly attached to the bow.

U.S. Pat. No. 5,787,832 is a floatation element,—the bow plate of the present invention is thin and does not contribute to the floatation of the hull.

2. The bow plate of the present invention is mounted at the waterline—the patents have submerged horizontal plates.

The bow plate of the present invention reduces hull drag by reducing the bow sinkage.

U.S. Pat. Nos. 3,934,531 and 4,003,325 disclose a submerged horizontal bow plate which reduces the bow wave resistance similar to the bulb below for a cargo vessel hull.

The bow plate of the present invention is for a blunt box bow.

U.S. Pat. No. 3,680,517 discloses an air ejector for drag reduction.

U.S. Pat. No. 4,569,302 discloses barge stem skegs (rudders)—not applicable to the present invention.

3. The bow plate of the present invention reduces the bow sinkage and drag of full blunt hulls.

U.S. Pat. Nos. 5,090,352 and 5,117,882 and others disclose an air ejector system mounted on or ahead of the fine ship bow. This reflects the observations that for thin streamline ship bows, the flow streamlines form a bit ahead of the bow so the air will be more effective when ejected in this position. However, the ejectors are thin like the bow—the bow plate of the present invention is wide and only extends partially below the water surface in contrast to FIG. 11.

The following Table A contains the inventor's comments:

TABLE A

Summary of Patent review by Dr. R. Latorre

| No. (Date) | Comments |
| --- | --- |
| 661,303 (1900) | Porous Bow for air ejection for reducing skin friction |
| 2,378,822 (1945) | Porous Bow for air ejection for reducing skin friction |
| 3,680,517 (1970) | Ejector design for reducing skin friction |
| 3,9534,531 (1976) | Horizontal plate extending forward of bow for drag reduction |
| 4,003,325 (1977) | Bow Design with Horizontal plate extending forward of bow for Drag reduction |
| 4,041,885 (1977) | Horizontal foil mounted below bow for reducing pitch motion In waves |
| 4,377,123 | Plate stabilizer apparatus for reducing rolling motion below the Bottom of the boat |
| 4,513,679 | Flexible rubber sheet which conveys air along the bow into the Bottom of a barge |
| 4,569,302 | Skeg design for mounting on barge stem for improving towing |

TABLE A-continued

Summary of Patent review by Dr. R. Latorre

| No. (Date) | Comments |
|---|---|
| 4,776,294 | Horizontal plate mounted on bow for reducing bow pitch motions |
| 5,090,352 | Bow Foil for introducing as bubbles into bow flow |
| 5,117,882 | Bow Foil for introducing as bubbles into bow flow |
| 5,787,832 | Stabilizer system with floats attached to sides and bow |

Table A Summary of Patent Review by Dr. R. Latorre
Comments on patents:

The state of the art covers vertical plates, air ejectors but does not deal with the bow plate reduction of blunt bow trim and drag as the speed increases.

The patents disclose the working element—plates/hydrofoils submerged below the water surface—the working element of the bow plate of the present invention cuts the surface and is offset from the bow. The bow plate of the present invention preferably also covers the entire bow width rather just than the bow stem.

The present invention is an attachable vertical bow plate set a distance ahead of the existing bow. This plate preferably extends above and below the water surface. Its lower edge is preferably set at a depth corresponding to the depth where the existing bow begins to have its cut away. The plate preferably extends upwardly at least the distance it extends downwardly into the water when the boat is under way.

The present invention includes a preferably flat plate attached to a barge or other vessel having a substantially flat front surface, the flat plate being attached such that the plate, when the vessel is underway, is partially above and partially below the waterline. The plate preferably has a width which is 70–120% of the width of the vessel, and more preferably 90–110% of the width of the vessel. The plate preferably has a depth, when the vessel is underway, which is 10–30% of the depth of the vessel when the vessel is underway, taken from water surface. The plate preferably extends at least as far above the water surface as below the water surface, when the vessel is under way. The vessel can be an armored personnel carrier.

Configuring the bow plate like a cow catcher on a steam engine can be useful in operation in river areas with floating debris. The flat plate is attractive for retrofits.

The bow plate can be wedge shaped. The hull can have scallops in the comers of the leading end. The bow plate and scallops in the hull enhance side eddy cancellation.

Hull roughness, wind and wave conditions can impact the effectiveness of the bow plate of the present invention.

The bow plate invention of the present invention can be used on lift boats, jack-up rigs, in oil & gas industry applications, cargo barges, and military applications. The drag reduction technology of the present invention developed for lift boats can be used for other vessels such as the M113 Armored Track Vehicle, the Lockheed-Martin Troop Carrier, and other military vehicles under development by Lockheed-Martin.

The invention was developed by Professor Latorre at the University of New Orleans (UNO). UNO has an undergraduate and graduate naval architecture offered by the School of Naval Architecture & Marine Engineering. The development of the bow plate was done using the 125 ft×15 ft×7 ft deep model towing tank. This facility enables ¼ to ¹⁄₆₀ scale models of ships and offshore structures to be tested in both calm water and sea wave conditions.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein:

FIG. 7 is a partial perspective view of a barge having a bow plate thereon;

FIG. 8 is a partial side view of a barge having a bow plate thereon;

FIG. 9 is a partial top view of a barge having a bow plate thereon;

FIG. 10 is a partial front view of a barge having a bow plate thereon;

DETAILED DESCRIPTION OF THE INVENTION

Jack-up drilling rigs and oil service lift boats are an important component of Louisiana's economy. The bow plate 10 of the present invention increases the operational efficiency of these vessels by reducing hydrodynamic drag. Benefits for offshore operators include reduction in fuel consumption, increase in vessel speed and USCG regulated operating range, and reduced power train costs.

FIGS. 4 and 7–10 show barge 20 having bow plate 10 thereon. Barge 20 includes a substantially flat surface 21 on its leading edge, to which bow plate 10 is rigidly attached.

Figure 5:
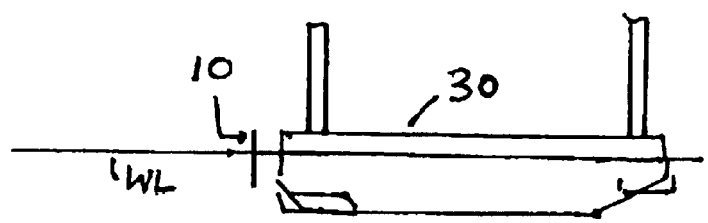
FIG. 5 shows a lift boat having a bow plate thereon.
Figure 6:
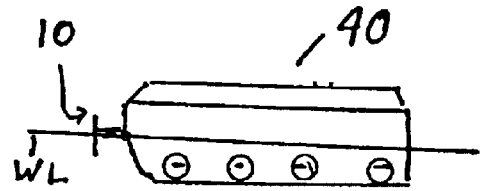
FIG. 6 shows a M113 personnel carrier in the amphibious mode having a bow plate thereon.
Figure 11:
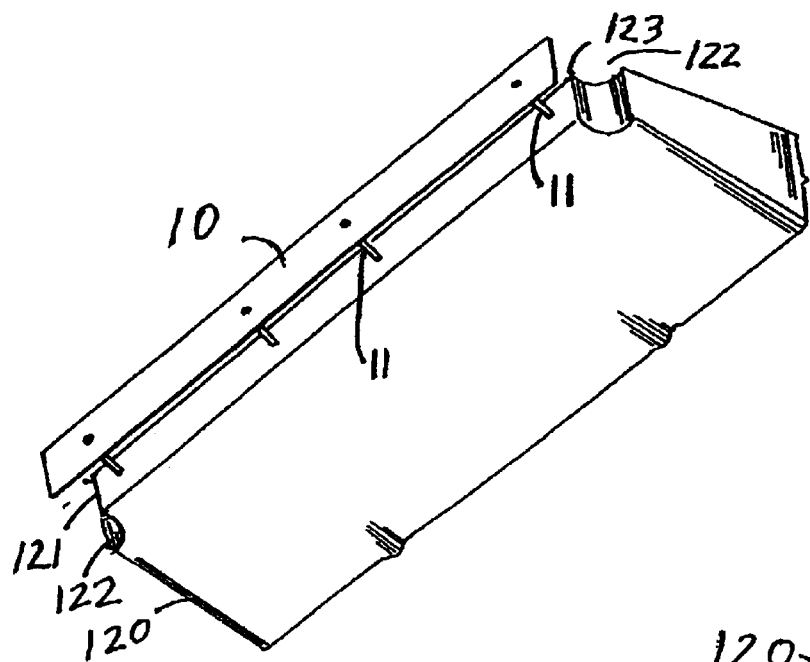
FIG. 11 is a partial perspective view of a scallop-hull barge having a bow plate thereon.
Figure 12:
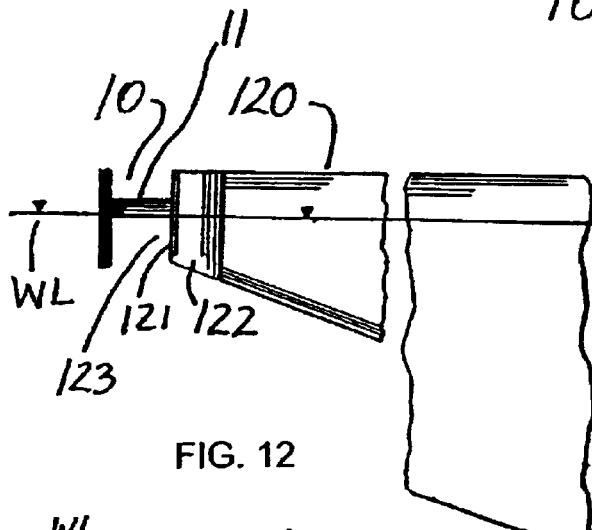
FIG. 12 is a partial side view of a scallop-hull barge having a bow plate thereon.
Figure 13:
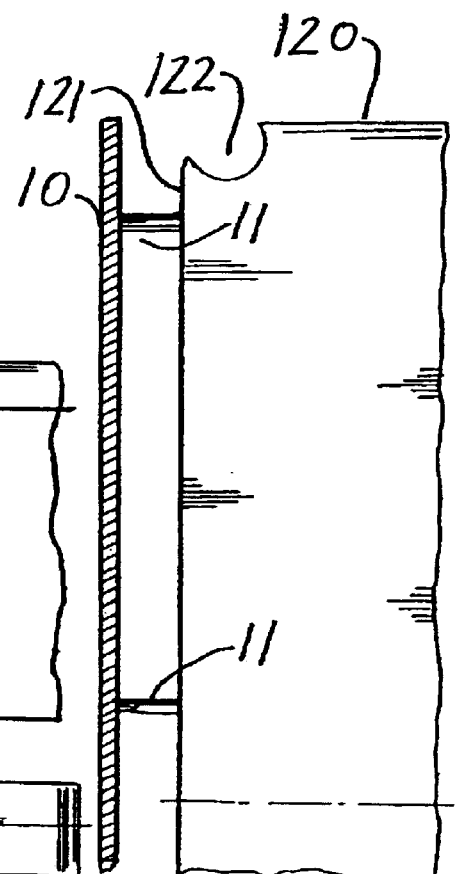
FIG. 13 is a partial top view of a scallop-hull barge having a bow plate thereon.
Figure 14:
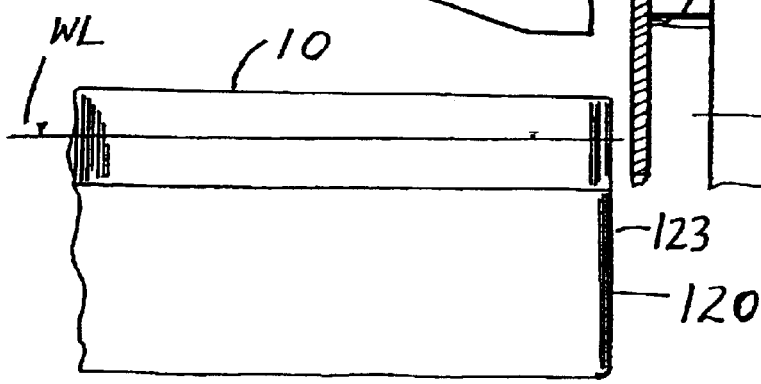
FIG. 14 is a partial front view of a scallop-hull barge having a bow plate thereon

FIG. 5 shows a lift boat 30 having a bow plate 10 thereon. FIG. 6 shows a M113 personnel carrier 40 in the amphibious mode having a bow plate 10 thereon.

FIGS. 11–14 show a scallop-hull barge 120 having a bow plate 10 thereon. Scallop-hull barge 120 includes a substantially flat surface 121 on its leading edge, to which bow plate 10 is rigidly attached. Scallophull barge 120 also includes scallops 122 on the comers of its leading edge to help reduce eddies.

The diameter of scallops 122 can be about ½ of the draft of the barge.

The bow plate 10 of the present invention is preferably attached such that there is a gap to the bow (see gap 15 in FIG. 10) which is 8–20% of the vessel width and/or 60–120% of the vessel draft when the vessel is underway.

The gap is related to the vertical distance from the waterline to the vessel bottom line measured at the leading edge of the bow. The gap is set such that side and bottom eddies are minimized. The appropriate gap is determined as a percentage (80 to 110%) of the vessel draft and 8 to 20% of the vessel width.

The plate preferably has a depth, when the vessel is underway, which is 10–60% of the draft of the vessel when the vessel is underway, taken from water surface.

Preferably, the plate has a width which is 70–130% of the width of the vessel. More preferably, the plate has a width which is 80–120% of the width of the vessel Even more preferably, the plate has a width which is 90–110% of the width of the vessel.

Preferably, the plate has a depth, when the vessel is underway, which is 10–60% of the depth of the vessel when the vessel is underway, taken from water surfacer. More preferably, the plate has a depth, when the vessel is underway, which is 15–45% of the depth of the vessel when the vessel is underway, taken from water surface.

Preferably, the plate has a thickness which is 70–130% of the thickness of the hull of the vessel. More preferably, the plate has a thickness which is 80–120% of the thickness of the hull of the vessel. Even more preferably, the plate has a thickness which is 90–110% of the thickness of the hull of the vessel.

Preferably, when the vessel is underway the plate extends a distance above the water surface approximately equal to the depth of the vessel when the vessel is underway, taken from water surface.

Preferably, the plate has a front which is set a distance forward of the front of the vessel equal to about 70–130% of the depth of the vessel when the vessel is underway, taken from water surface. More preferably, the plate has a front which is set a distance forward of the front of the vessel equal to about 80–120% of the depth of the vessel when the vessel is underway, taken from water surface. Even more preferably, the plate has a front which is set a distance forward of the front of the vessel equal to about 90–110% of the depth of the vessel when the vassel is underway, taken from water surface.

Preferably, the plate has a front which is set a distance forward of the front of the vessel approximately equal to the depth of the vessel when the vessel is underway, taken from water surface.

Bow plate 10 can be made of steel, wood or composite materials, for example. In the drawings, it is attached to a barge with supports 11, which can be attached to bow plate 10 with/by welding, bolting or removable jig and to barge 20, for example, with/by welding, bolting or removable jig. Supports 11 can be made of steel pipe or steel beams, for example. When attached to a standard river barge having dimensions of 185 feet in length, 35 feet in width, a draft of 9 feet, and a hull thickness of 1 inch, bow plate 10 can be made of standard barge steel and have dimensions of 7–8 feet in height, 1–2 inches in thickness, set such that 12–24 inches are above the waterline WL and 1–3 feet are below the waterline WL when the barge is loaded to rated capacity and is underway, and supports 11 can be made of steel pipe or steel beam and can be attached to the bow plate 10 and barge 20 by welding.

The height of bow plate 10 can be made variable as with vertically telescoping plates (this might perhaps be more useful for a lift boat than for a barge, as barges are usually loaded to a given draft mark and moved loaded). Also, the placement of the center at waterline WL can be made adjustable depending upon the load in the barge (as by sliding up and down on the supports 11).

When several barges are attached together, typically one would only use bow plates on the leading barges.

One could extend the deck over the bow plate 10 (and could perhaps do without supports 11 in some cases) to help prevent someone from falling onto the bow plate 10 and hurting himself.

Preliminary tests with a 1/25-scale model were conducted at UNO's towing tank facility. Results confirmed that a simple bow plate reduced bow trim and resulting drag by 15% for typical operating speeds of 5 to 7 kt.

The bow plate 10 of the present invention can be used for various offshore support vessels.

The bow plate technology of the present invention is adaptable to any rectangular water craft with square, blunt bows ranging from river barges to military landing craft and personnel carriers, and including oil service lift boats and jack-up drilling rigs.

Bow plate dimensions and placement can be refined to optimize bow trim and drag reduction using the UNO Towing Tank Facility.

The bow plate of the present invention can be used on an existing lift boat. Also, new boats can be constructed with bow plates of the present invention on them.

Operational cost savings and benefits of incorporating a bow plate of the present invention include fuel savings, increased speed resulting in increased on-site productive time, reduced power train requirements.

Offshore oil & gas is a multi-billion dollar industry in Louisiana Jack-up drilling rigs are used extensively to develop and explore for petroleum in the Gulf of Mexico. Lift boats are similar to jack-up rigs, but carry equipment to service and maintain fixed offshore installations. Over 45 lift boats operate from Louisiana ports and 5–8 are built each year, a similar number of jack-up rigs operate in Louisiana waters. Increased efficiency of the se vessels will contribute significantly to lower oil & gas production costs.

The present invention comprises a bow plate to reduce hydrodynamic drag. Benefits for offshore operators include:

A significant reduction in fuel consumption costs. An increase in vessel speed will increase productive "on-site" time (day rates are typically $35,000 to 40,000);

An increase in vessel speed will also extend the operating range of lift boats. Currently the U.S. Coast guard limits their operating range from port to 10 hours;

Power train costs for the vessels could be decreased because a more efficient hull design requires less horsepower to achieve to same speed. ("Downsizing" engine and power train specifications would result in reduced construction and maintenance costs.)

The present invention can be used in the oil & gas industry, and ocean-going and Mississippi River cargo barges. The savings in fuel and equipment costs and decreased transit times for the nation's manufactured goods and resources would have a significant impact on the nation's economy.

The bow plate technology of the present invention can be utilized in a number of critical industries depending on vessel application. The most prominent industries include: 1) Oil & Gas extraction—lift boats, jack-up rigs, 2) Transportation—river and ocean going cargo barges, and 3) Defense Industry—various personnel carriers and landing craft.

Ship performance improvement requires reducing propulsion power. This improvement impacts vessel first cost as well as the total vessel ownership cost. The towing tank tests of William Froude identified the three principal resistance components: form resistance, wave resistance and skin friction resistance Saunder (1957), Newman (1980). The bulbous bow is an example of a successful hydrodynamic technique to reduce wave resistance. It has had a significant impact in the way ship hulls are designed and on fuel savings during operation Lewis (1988).

The present invention focuses on applying advances in fluid mechanics to reducing form resistance from the large comer eddy formed at the sides and bottom edges of blunt bows typically used in a number of offshore vessels such as self propelled lift boats, towed jack-up drilling rigs as well as towed barges.

The French engineer G. Eiffel (1913) examined the effect on the drag from changing the spacing d between two disks. This work was extended by Morel and Bohn (1980) to examine semi-truck drag reduction from fitting a shield on the roof of tractor trailers. Koenig and Roshko (1985) reported the drag reduction from fitting a plate ahead of an axis symmetric body. Gorban (1997) has discussed this interaction in terms of bow-eddy cancellation. From these two dimensional experiments, it has been possible to characterize the drag reduction $DC_d$ as a function of the Reynolds number Rn (=V $d_2$/u), the ratio of forward plate spacing ahead of the blunt body g to the blunt body width or diameter $d_2$, as well as the ratio of forward plate diameter or width $d_1$ to the blunt body width or diameter $d_2$.

$$DC_d = \text{function } (g/d_2, d_1/d_2, Rn) \text{ (2 dimensional case)} \quad (1)$$

The maximum reduction, $DC_d$=30% was reported by Koenig and Roshko (1985) at width Reynolds number Rn=V $d_2$/u=6.7×10$^5$ the parameter values: g/$d_2$.=0125 and $d_1$/$d_2$= 0.875.

The majority of barges and offshore structures such as jack-ups and lifeboats have rectangular hulls with square, blunt bows. They require a large amount of power when they are towed or self-propelled. Careful observation of the bow flow shows a large eddy forms at the bow comers and bottom as water is displaced ahead sideways and downwards as the vessel moves. With increased speed, this bow wave/eddy acts to sink the bow with a corresponding increase in the vessel resistance. Further increase in speed results in more bow sinkage, until the "swamping" speed limit is reached Meyerhoff, (1966). At the swamping speed, the bow sinks and water flows over the bow top. This bow sinkage has been observed in barges Latorre (1981) as well as amphibious vehicles Contractor, (1965), Meyerhoff, (1966). For these box shaped offshore structures like jack-ups and lift boats, the bow sinkage limits the towing/operational speeds.

To reduce this bow sinkage and achieve drag reduction and increased operational speeds, the present inventor developed and tested a three dimensional blow plate. It was fitted on a $\frac{1}{25}^{th}$ scale model lift boat hull fitted with simulated jacking feet. The particulars of the lift boat model A and the three dimensional bow plate are summarized in Table 1.

TABLE 1

Particulars of Lift Boat Model A and Bow Plate Ratios

| Item, Symbol, units | LiftBoat Model A | Bow Plate Ratios |
|---|---|---|
| Length, L, m | 2.13 | — |
| Beam, B, m | 1.36 | — |
| Draft, T, m | 0.1524 | — |

TABLE 1-continued

Particulars of Lift Boat Model A and Bow Plate Ratios

| Item, Symbol, units | LiftBoat Model A | Bow Plate Ratios |
|---|---|---|
| Displacement, D, Kg | 176 | — |
| Bow Plate width, $d_1$, m | 1.30 | $D_1/B = 0.96$ |
| Bow Plate draft, $d_3$, m | 0.15 | $D_3/T = 0.98$ |
| Bow Plate gap, g, m | 0.1524 | g/T = 1.0 |
|  |  | g/B = 0.112 |

Figure 1:
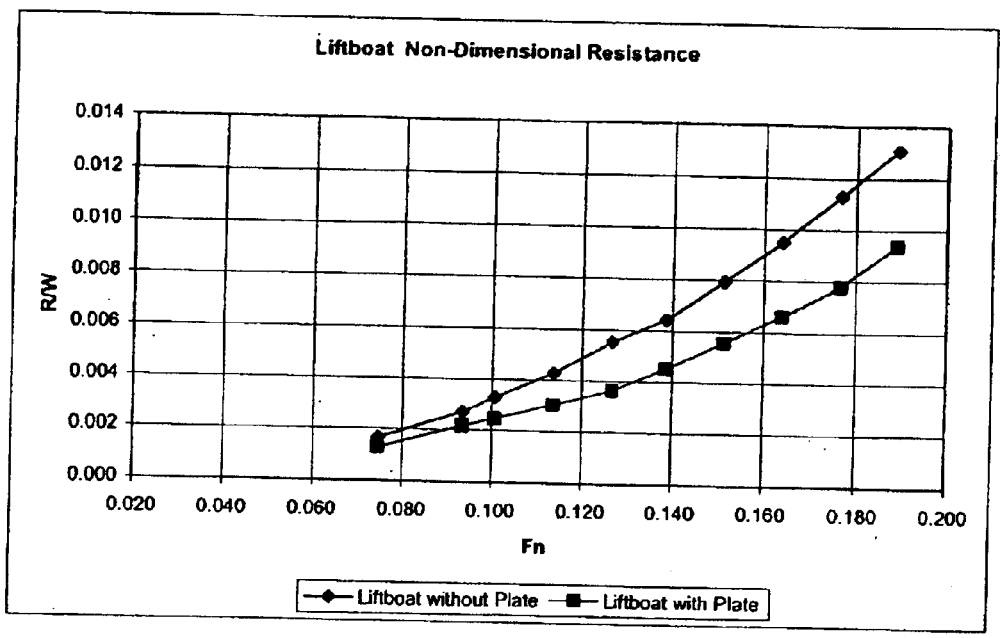
FIG. 1 shows Non dimensional Lift boat Model A resistance test results with/without the bow plate (Resistance/weight R/W versus Froude Number Fn (details in Table 1))
Figure 2:
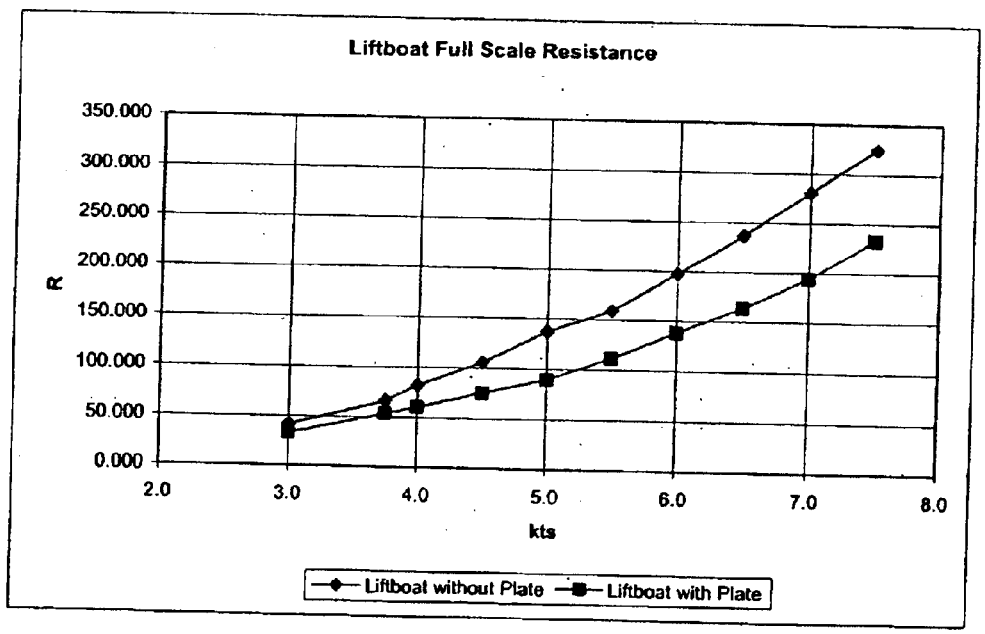
FIG. 2 shows Full Scale Lift boat Model A resistance versus speed with/without the bow plate (Resistance and speed scaled from Model A test results in FIG. 1 (details in Table 1))
Figure 3:
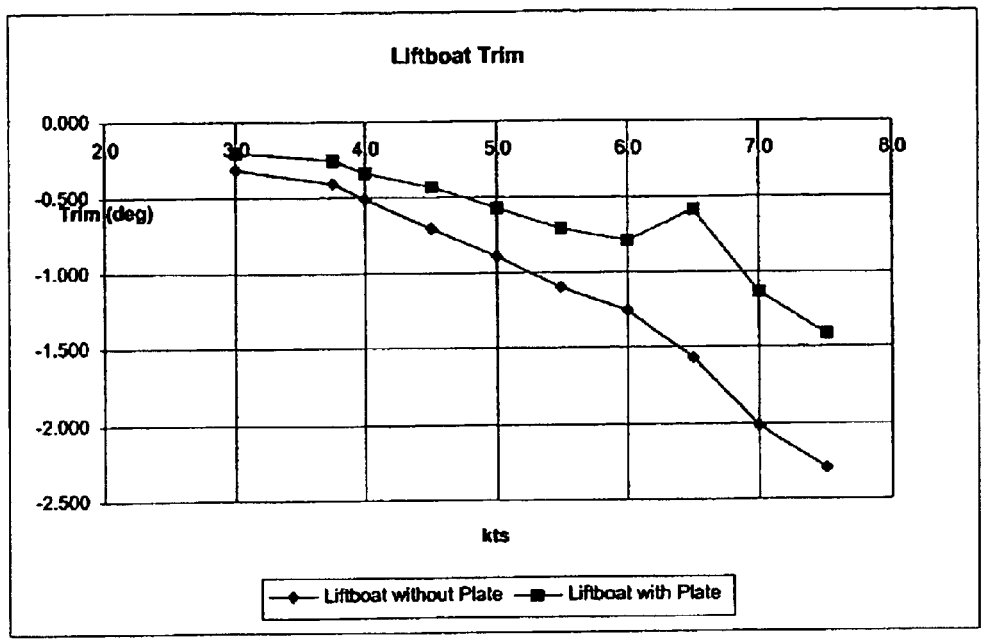
FIG. 3 shows Lift boat trim estimated from Model A tests with/without bow plate.
Figure 4:
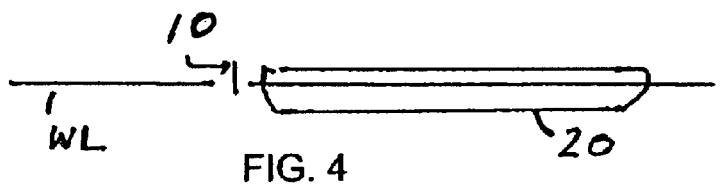
FIG. 4 shows a barge having a bow plate thereon.

The lift boat model A tests were completed in the University of New Orleans (UNO) 125 ft×15 ft×7 ft deep towing tank. The model A tests were completed during the NAME 3150 class laboratory at the University of New Orleans. In an analogous manner to the two dimensional plate, the bow plate reduces the under bow flow and sinkage. The resistance curves of resistance to lift boat weight R/W versus non-dimensionalized test speed (Froude number) are shown in FIG. 1. The scaled-up resistance versus speed are shown in FIG. 2. These figures show that by fitting the bow plate, the resistance of the lift boat model A is reduced by 15% in the 5–7 kt operating speed range. The corresponding reduction in trim with/without the bow plate is shown in FIG. 3. These plots show that fitting the bow plate resulted in reduction in lift boat resistance and bow trim over the entire speed range. There is also a shift in the swamping speed limit. These tests show that the three dimensional bow plate drag reduction $DC_d$ is related to Froude number Fn=V/$\sqrt{gL}$ along with the critical parameters for the three dimensional bow plate in terms of the bow beam, B, and draft, T:

$$DC_d = \text{function } (d_3/T, g/T, d_1/B\ g/B, Rn, Fn) \text{ (3 dimensional case)} \quad (2)$$

The present generation of lift boat designs do not use any drag reduction systems comparable to the bow plate to reduce bow sinkage, bow comer eddy, and water pile-up ahead of the hull. The 15% bow plate drag reduction holds promise of savings from smaller towing tug or lift boat propulsion plants with a corresponding saving from lower fuel consumption and smaller tug/propulsion engine cost. As a retrofit, it appears possible to extend the lift boat operational range by 10–15 nautical miles (i.e., operational range= speed×10 hrs).

The bow plate 10 of the present invention can be adapted to various vessel designs and configurations.

The present invention is an attachable vertical bow plate 10 set a distance ahead of the existing bow (bow 23 in FIGS. 7–10, 123 in FIGS. 11–14)). This plate 10 extends above and below the water surface WL. Its lower edge is preferably set at a depth corresponding to the depth where the existing bow 23, 123 begins to have its cut away.

When the barge-offshore structure is moving, the vertical bow plate 10 deflects the flow in a favorable manner. The presence of the vertical bow plate reduces the bow side eddy intensity as well as the amount of water pushed ahead of the bow and bow plate. The result is a reduction of bow sinkage and a reduction of the vessel resistance. This reduction can result in a smaller towing tug or propulsion plant with a corresponding saving from lower fuel consumption and smaller tug/propulsion engine cost.

Possible areas of commercial application of the invention:
The Attachable Bow Plate can be fitted to vessels with full boxy hull forms. These include Barges such as Ocean barges, bow of a river barge tow pushed by a towboat; offshore vessels such as oil field Jack-up platforms, and oil field lift boats; and hopper dredges and other vessels. The vessel to which the bow plate can be fitted can be an armored personnel carrier, such as the M-113 armored personnel carrier.

Presently used technology and its disadvantages

A large number of barges and offshore structures such as jack-ups and liftboats have rectangular hulls with square, blunt bows. A large amount of power is used when these vessels are towed or self- propelled.

Careful observation of the bow flow shows a large eddy forms at the bow corners and water is pushed ahead as the vessel moves.

The present generation of designs do not use any system comparable to the invention to reduce the bow sinkage, bow corner eddy and water pile-up ahead of the hull.

A 1/25 scale 6.25 ft long model has been tested in the UNO Tow Tank with and without the attachable bow plate 10 of the present invention.

The technology of the present invention could benefit lift boat and jack-up rig operators, the cargo barge industry.

In April 2002, a demonstration of a 1/25 scale model lift boat was conducted in UNO's Towing Tank Facility for representatives of the local shipbuilding industry.

In addition to the new-construction market, vehicles could be retrofitted with the bow plate of the present invention.

A full scale Bow Plate of the present invention can be temporarily installed on a working lift boat to demonstrate how it performs. This can also lead to practical engineering expertise to estimate production costs to fabricate a commercial quality bow plate.

The following references are incorporated herein by reference.

Contractor, D. N., Love, R. H, (1965) "An Experimental Investigation of Devices for Reducing the Hydoodynarnic Resistance of Amphibious Vehicles," Hydronautics Technical report 501-1, Laurel, Md. October, 1965. 30pp.

Daidola, J. Latorre, R. (2001) "Resistance Reduction of Displacement Hull Form by Fore-Aft Pressure Reduction", *Ocean Engineering*, Vol. 29 No. 3, pp. 1097–1118.

Eiffel, G., (1913), THE RESISTANCE OF AIR AND AVIATION, $2^{nd}$ ed. Constable & Co. London, pp. 54–60.

Gorban, V., (1997) "Dynamics of vortices in Near Wall Flows: Eigenfrequencies, Resonant Properties, Algorithms of Control," Proceedings Fluid Dynamics Panel Workshop-High Speed Body Motion in Water, AGARD R-827, Kiev, September 1997. PP 15–1–11.

Koenig, K, and Roshko, A., "An Experimental Study of Geometrical Effects on the Drag and Flow Field of Two Bluff Bodies Separated by a Gap," *Journal of Fluid Mechanics*, Vol. 156 pp. 167–204.

Latorre R, Ashcroft, F. (1981) "Recent Developments in Barge Design, Towing and Pushing," *Marine Technology*, Vol. 18, No. 1, January 1981 pp 10–21.

Latorre, R. (1997) "Ship Hull Drag Reduction Using Bottom Air Injection," *Ocean Engineering*, 1997, vol 24, pp 161–172.

Latorre, R., Mims, J. (1997)., "Development and Deployment of a Stable Tow Body," *Ocean Engineering*, Vol. 27, No. 2, pp 203–217.

Latorre, R., Miller, A., Philips, R. (2002) "Microbubble Drag Reduction for High Speed Craft, *Trans SNAME*, September 2002.

Lewis, E.ed (1988) PRINCIPLES OF NAVAL ARCHITECTURE, Vol. II Resistance, SNAME, New Jersey, 1988.

Newman, (1980) J. MARINE HYDRODYNAMICS, MIT Press, Cambridge, 1980.

Meyerhoff, L. (1966) Hydrodynamic research for box type amphibians, Final Report Contract NONR 4651(00), Eastern Research Group, New York, N.Y. November 1966, 30p.

Morel, T. and Bohn, M. (1980) "Flow over Two Circular Disks in Tandem," *ASME J. Fluids Engineering*, Vol. 102, pp 104–111.

Saunders, H. (1957) HYDRODYNAMICS IN SHIP DESIGN, Vols. I–II, SNAME, New York, 1957.

Fergunson, A. M. (1983) "An extrapolation Method for Ship Resistance Based on the Variation of Sinkage and Trim with Froude Number," TRANS RINA, vol. 125, pp. 17–30.

The following references authored or co-authored by the present inventor are incorporated herein by reference:

Latorre, R., Miller, A., Philips, R. (2002) "Microbubble Drag Reduction for High Speed Craft, *Trans SNAME*, September 2002.

Latorre, R. Vasconcellos, J. (2001) "Boat 2000 Database", *SNAME Marine Technology*, vol. 37, no. 2, pp. 79–87.

Latorre, R., Mims, J., "Development and Deployment of a Stable Tow Body," *Ocean Engineering*, vol. 27, no. 2, pp 203–217.

Latorre, R., "Ship Hull Drag Reduction Using Bottom Air Injection," *Ocean Engineering*, 1997, vol. 24, pp. 161.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. Apparatus comprising:
   a flat or wedge-shaped plate attached to a barge or other vessel having a substantially flat front surface, the plate being attached such that the plate, when the vessel is underway, is partially above and partially below the waterline and is forward of the vessel when the vessel is moving forward, wherein the plate has a front which is set a distance forward of the front of the vessel to minimize eddies.

2. The apparatus of claim 1, wherein the plate has a width which is 70–120% of the width of the vessel.

3. The apparatus of claim 1, wherein the plate has a depth, when the vessel is underway, which is 10–60% of the draft of the vessel when the vessel is underway, taken from water surface.

4. The apparatus of claim 1, wherein the vessel is an armored personnel carrier.

5. The apparatus of claim 1, wherein the plate has a width which is 90–1 10% of the width of the vessel.

6. Apparatus comprising:
   a plate attached to a barge or other vessel having a substantially flat, front surface, the plate being attached such that the plate, when the vessel is underway, is partially above and partially below the waterline and is forward of the vessel when the vessel is moving forward, wherein the plate has a front which is set a distance forward of the front of the vessel to minimize eddies.

7. The apparatus of claim 6, wherein the vessel has a width and the plate has a width which is 70–130% of the width of the vessel.

8. The apparatus of claim 6, wherein the vessel has a width and the plate has a width which is 80–120% of the width of the vessel.

9. The apparatus of claim 6, wherein the vessel has a width and the plate has a width which is 90–110% of the width of the vessel.

10. The apparatus of claim 6, wherein the vessel has a depth when underway and the plate has a depth, when the vessel is underway, which is 10–60% of the depth of the vessel when the vessel is underway, taken from water surface.

11. The apparatus of claim 6, wherein the vessel has a depth when underway and the plate has a depth, when the vessel is underway, which is 15–45% of the depth of the vessel when the vessel is underway, taken from water surface.

12. The apparatus of claim 6, wherein the vessel has a depth when underway and the plate has a depth, when the vessel is underway, which is 10–30% of the depth of the vessel when the vessel is underway, taken from water surface.

13. The apparatus of claim 6, wherein the vessel has a hull having a thickness and the plate has a thickness which is 70–130% of the thickness of the hull of the vessel.

14. The apparatus of claim 6, wherein the vessel has a hull having a thickness and the plate has a thickness which is 80–120% of the thickness of the hull of the vessel.

15. The apparatus of claim 6, wherein the vessel has a hull having a thickness and the plate has a thickness which is 90–110% of the thickness of the hull of the vessel.

16. The apparatus of claim 6, wherein the vessel is an armored personnel carrier.

17. The apparatus of claim 6, wherein the vessel has a depth when underway and when the vessel is underway the plate extends a distance above the water surface approximately equal to the depth of the vessel when the vessel is underway, taken from water surface.

18. Apparatus comprising:
a plate attached to a barge or other vessel having a substantially flat, blunt front surface, the plate being attached such that the plate, when the vessel is underway, is partially above and partially below the waterline and is forward of the vessel when the vessel is moving forward, wherein the plate has a front which is set a distance forward of the front of the vessel to minimize eddies.

19. The apparatus of claim 6, wherein the plate is rigidly attached to the vessel.

20. The apparatus of claim 6, wherein the vessel has a depth when underway and the plate front is set a distance forward of the front of the vessel equal to about 70–130% of the depth of the vessel when the vessel is underway, taken from water surface.

21. The apparatus of claim 6, wherein the vessel has a depth when underway and the plate front is set a distance forward of the front of the vessel equal to about 80–120% of the depth of the vessel when the vessel is underway, taken from water surface.

22. The apparatus of claim 6, wherein the vessel has a depth when underway and the plate front is set a distance forward of the front of the vessel equal to about 90–110% of the depth of the vessel when the vessel is underway, taken from water surface.

23. The apparatus of claim 6, wherein the vessel has a depth when underway and the plate front is set a distance forward of the front of the vessel approximately equal to the depth of the vessel when the vessel is underway, taken from water surface.

24. The apparatus of claim 6, wherein the plate front is set a distance forward of the front of the vessel equal to about 8–20% of the width of the vessel or 60–120% depth of the vessel when underway.

25. Apparatus comprising:
a plate attached to a barge or other vessel having a substantially flat, blunt front surface, the plate being attached such that the plate, when the vessel is underway, is partially above and partially below the waterline and is forward of the vessel when the vessel is moving forward, with a bow modified by circular cutaways at the corners to reduce side eddies.

26. The apparatus of claim 6, wherein the plate has a gap to the bow which is 8–20% of the vessel width and/or 60–120% of the vessel draft when the vessel is underway.

27. The apparatus of claim 6, wherein the vessel has a depth when underway and the plate has a forward offset, when the vessel is underway, which is 8–20% of the vessel width and/or 60–120% of the vessel draft when underway.

* * * * *